(12) United States Patent
Kuempel et al.

(10) Patent No.: US 9,154,547 B2
(45) Date of Patent: Oct. 6, 2015

(54) METHODS FOR BREWING COFFEE

(71) Applicant: Blossom Coffee, Inc., San Francisco, CA (US)

(72) Inventors: Jeremy Kuempel, San Francisco, CA (US); Matthew Walliser, San Francisco, CA (US); Matthew Leanse, San Francisco, CA (US)

(73) Assignee: Blossom Coffee, Inc., San Francisco, CA (US)

( * ) Notice: Subject to any disclaimer, the term of this patent is extended or adjusted under 35 U.S.C. 154(b) by 0 days.

(21) Appl. No.: 14/213,882

(22) Filed: Mar. 14, 2014

(65) Prior Publication Data

US 2014/0314921 A1 Oct. 23, 2014

Related U.S. Application Data

(60) Provisional application No. 61/785,348, filed on Mar. 14, 2013.

(51) Int. Cl.
| | |
|---|---|
| *H04L 29/08* | (2006.01) |
| *A47J 31/52* | (2006.01) |
| *A47J 31/56* | (2006.01) |
| *A47J 31/44* | (2006.01) |

(52) U.S. Cl.
CPC ................ *H04L 67/10* (2013.01); *A47J 31/52* (2013.01); *A47J 31/56* (2013.01); *A47J 31/4492* (2013.01)

(58) Field of Classification Search
CPC ................................ A23F 5/262; H04L 67/10
See application file for complete search history.

(56) References Cited

U.S. PATENT DOCUMENTS

| | | | | |
|---|---|---|---|---|
| 2,568,840 | A | * | 9/1951 | Zees ................................ 99/282 |
| 3,451,329 | A | * | 6/1969 | Herrera .......................... 99/290 |
| 5,404,794 | A | | 4/1995 | Patel et al. |
| 5,657,683 | A | * | 8/1997 | Sandei et al. ................... 99/287 |
| 5,875,703 | A | | 3/1999 | Rolfes |
| 6,095,031 | A | | 8/2000 | Warne |
| 6,227,101 | B1 | | 5/2001 | Rabadi et al. |
| 6,339,985 | B1 | | 1/2002 | Whitney |
| 7,285,300 | B1 | | 10/2007 | Allington et al. |
| 7,455,867 | B1 | | 11/2008 | Gutwein et al. |
| 7,861,644 | B2 | | 1/2011 | Ghassemlou et al. |
| 8,371,211 | B2 | | 2/2013 | Nosler et al. |

(Continued)

FOREIGN PATENT DOCUMENTS

EP          380450       *  1/1990

OTHER PUBLICATIONS

English Translation for EP380450 published Jan. 1990.*

*Primary Examiner* — Anthony Weier
(74) *Attorney, Agent, or Firm* — Jeffrey Schox; Diana Lin

(57) ABSTRACT

One variation of a method for brewing a cup of coffee at a coffee brewing machine includes: receiving a coffee source identifier; retrieving a recipe for a brewing coffee bean based on the coffee source identifier; initiating a brew cycle; heating water in a boiler to a target temperature specified by the recipe; metering a volume of water from the boiler into a brew chamber; heating the brew chamber to maintain the volume of water near the target temperature; according to the recipe, displaying an agitation instruction at a first time during the brew cycle; according to the recipe, triggering a first alarm to cease agitation at a second time during the brew cycle; and according to the recipe, triggering a second alarm to dispense fluid from the brew chamber at a third time during the brew cycle.

15 Claims, 7 Drawing Sheets

(56) References Cited

U.S. PATENT DOCUMENTS

| | | |
|---|---|---|
| 8,621,982 B2 | 1/2014 | Nosler et al. |
| 2005/0105395 A1* | 5/2005 | Harrison .................. 368/10 |
| 2005/0166765 A1* | 8/2005 | Lyall, III .................. 99/280 |
| 2008/0282897 A1* | 11/2008 | Webster et al. .................. 99/280 |
| 2012/0156344 A1* | 6/2012 | Studor et al. .................. 426/433 |
| 2013/0156904 A1 | 6/2013 | Nosler et al. |
| 2014/0079854 A1* | 3/2014 | Vastardis et al. .............. 426/425 |

* cited by examiner

METHODS FOR BREWING COFFEE

CROSS-REFERENCE TO RELATED APPLICATIONS

This application claims the benefit of U.S. Provisional Application No. 61/785,348, filed on 14 Mar. 2013, which is incorporated in its entirety by this reference.

TECHNICAL FIELD

This invention relates generally to the field of coffee preparation, and more specifically to a new and useful method for brewing coffee in the field of coffee preparation.

DESCRIPTION OF THE EMBODIMENTS

The following description of the embodiment of the invention is not intended to limit the invention to these embodiments, but rather to enable any person skilled in the art to make and use this invention.

1. First Method and Applications

Figure 1:
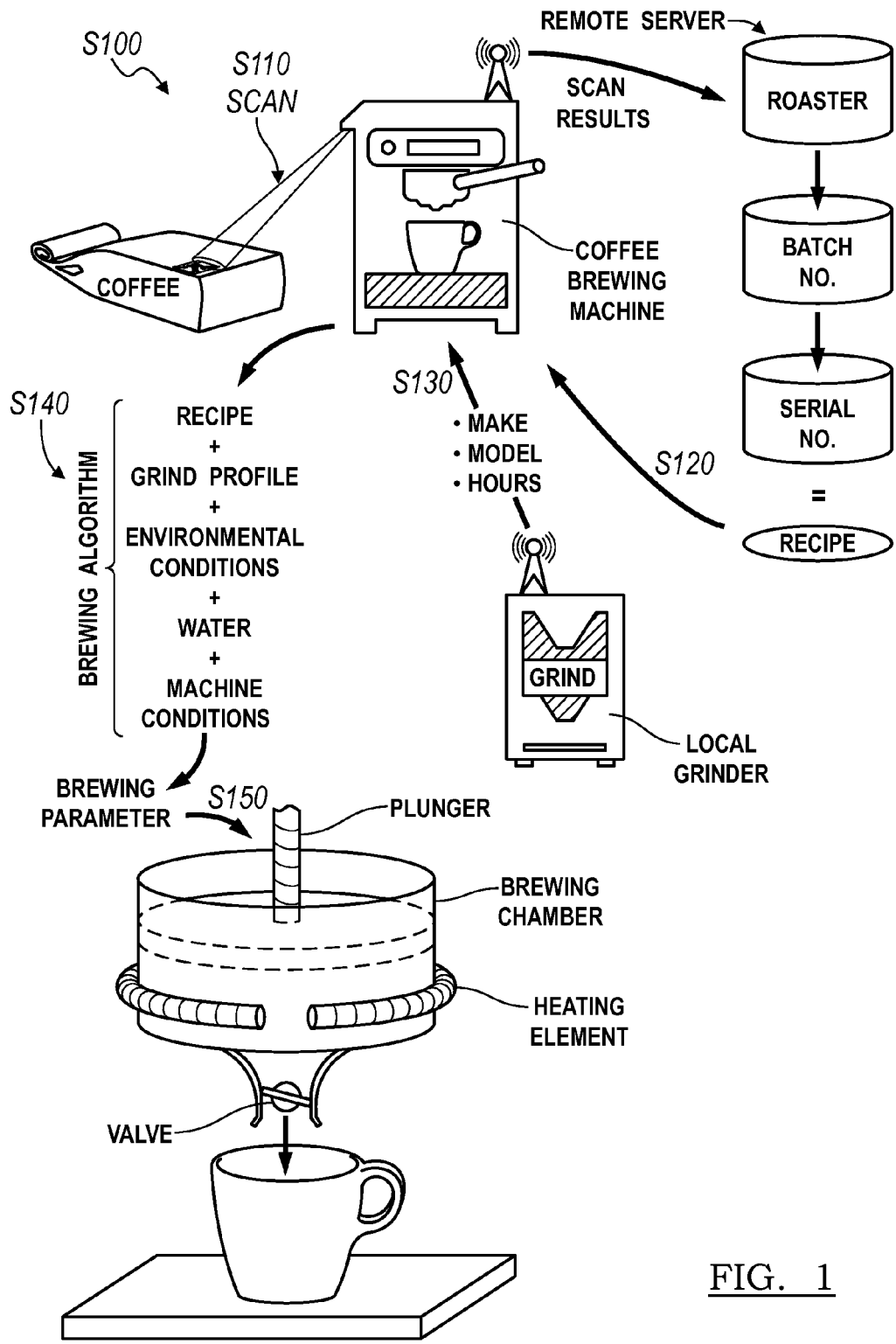
FIG. 1 is a flowchart representation of a method of one embodiment.

As shown in FIG. 1, a method for brewing coffee at a coffee brewing machine includes: identifying a coffee bean from data derived from a canister containing the coffee bean in Block S110; retrieving a recipe for the coffee bean in Block S120, the recipe specified by a coffee roaster supplying the coffee bean; identifying a grind profile of the coffee bean in Block S130; setting brewing parameters at the coffee brewing machine based on the recipe and the grind profile of the coffee bean in Block S140, the brewing parameters including a brew temperature and a steep time; and controlling the coffee brewing machine according to the brewing parameters to brew the cup of coffee from the coffee bean in Block S150.

Figure 7:
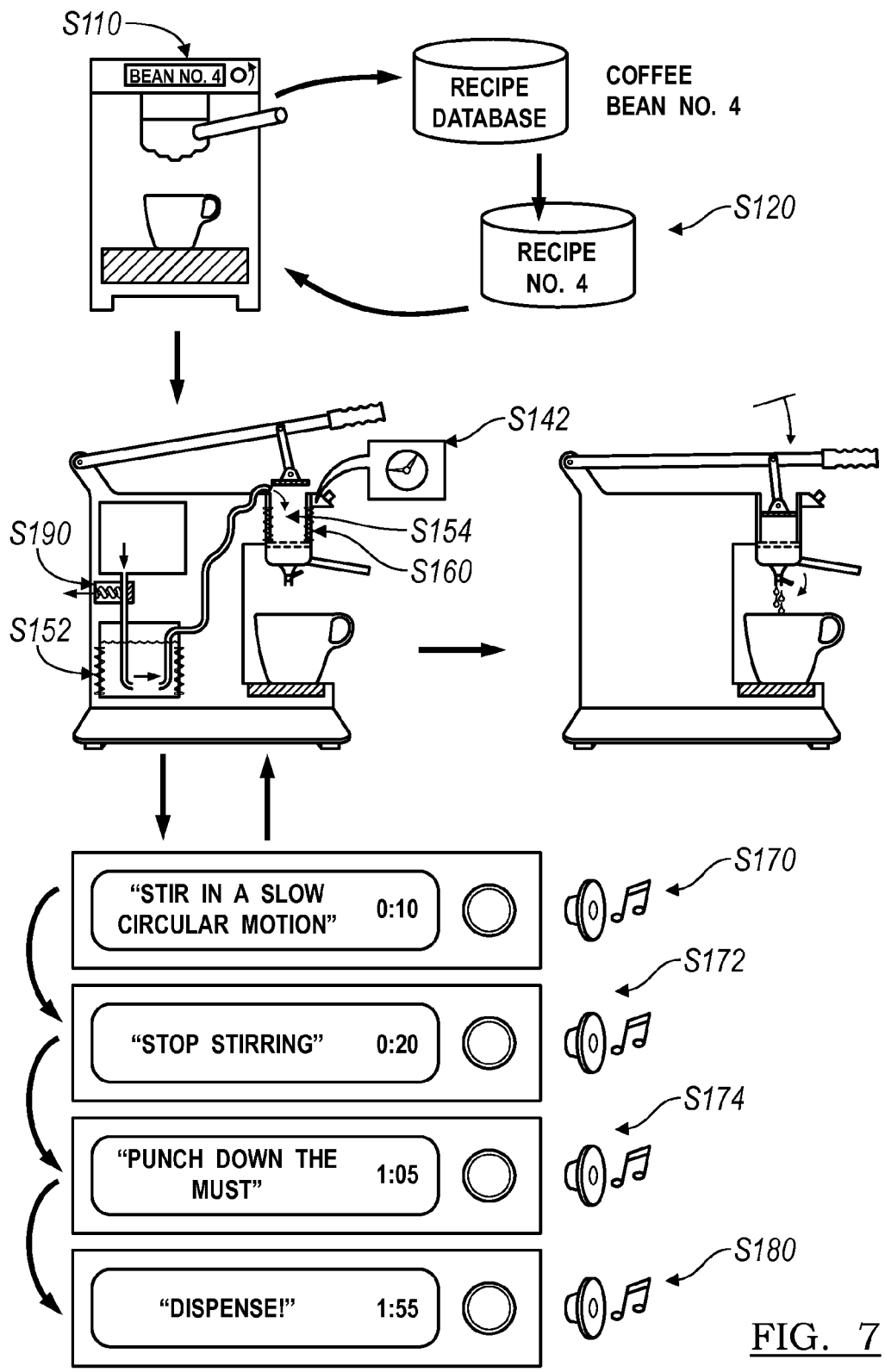
FIG. 7 is a flowchart representation of one variation of the method.

As shown in FIG. 7, one variation of first method S100 for brewing a cup of coffee at a coffee brewing machine includes: receiving a coffee source identifier in Block S110; retrieving a recipe for brewing a coffee bean based on the coffee source identifier in Block S120; initiating a brew cycle in Block S142; heating water in a boiler to a target temperature specified by the recipe in Block S152; metering a volume of water from the boiler into a brew chamber in Block S154; heating the brew chamber to maintain the volume of water near the target temperature in Block S160; according to the recipe, displaying an agitation instruction at a first time during the brew cycle in Block—S170; according to the recipe, triggering a first alarm to cease agitation at a second time during the brew cycle in Block S172; and according to the recipe, triggering a second alarm to dispense fluid from the brew chamber at a third time during the brew cycle in Block S180.

First method S100 functions to set and control brewing parameters for a coffee bean based on a predetermined coffee recipe to enable accurate and repeatable replication of a coffee experience, such as defined by a coffee roaster supplying the coffee bean. In particular, first method S100 can enable a coffee roaster to refine and set a specific brewing recipe for his coffee bean, such as on a bean type basis, on a roast batch number basis, or even on a per-pound of coffee basis, thereby providing the coffee roaster with controls to predetermine and remotely (and asynchronously) oversee the flavor of every cup of coffee brewed with his coffee beans, whether in a local coffee shop, in a remote café, or in a private residence.

First method S100 can enable this functionality by identifying a particular whole or ground coffee bean selected for an upcoming brew cycle, such as based on an identifier applied to packaging containing the bean or based on a selection for the coffee bean entered manually into the coffee brewing machine. First method S100 then retrieves a brew recipe specific to the identified coffee bean, such as from local memory or from a remote database of coffee brewing recipes. Alternatively, first method S100 can extract the recipe directly from the coffee bean packaging (e.g., a one-pound coffee bag, a coffee tin), such as by reading and translating a quick-response (QR) code, a bar code, a RFID tag, or other embedded code applied or printed onto the packaging. First method S100 then sets brewing parameters to brew cup, pot, or other volume of coffee with the coffee bean (i.e., a brew cycle) at the coffee brewing machine. For example, first method S100 can account for a current state of the coffee brewing machine or a local coffee grinder (e.g., hours, wear), water quality, environmental conditions, or coffee bean quality (e.g., age, moisture content), etc. to map the recipe to the coffee brewing machine for the current brew cycle.

First method S100 is described generally in the context of brewing coffee. For example, first method S100 can control various parameters to accurately and repeatably recreate a coffee flavor experience—as defined by an affiliated coffee roaster—from freshly-ground whole coffee beans. However, first method S100 can also be applicable to brewing tea or to brewing any other hot to cold beverage. Furthermore, first method S100 is described generally in the context of replicating a coffee experience defined by a coffee roaster by accurately and repeatedly executing a recipe set by the roaster for the particular coffee bean. However, any other entity can create, modify, or set a recipe for brewing a coffee bean (or other steeping material), such as a café manager, a trained barista, a taste representative of a restaurant that serves its own "brew" of a common coffee, a hotel manager, a representative of a catering service, or any other representative of a food- or drink-related business or service in order to customize the recipe for the business or service. A user can also create, modify, or set the recipe and then share the recipe with other users (e.g., other cafés, other baristas), such as over a social networking system, through an online forum, or via an execution file shared via email.

2. Coffee Brewing Machine

Blocks of first method S100 can execute on a coffee brewing machine capable of automatically controlling brew time, brew temperature, brewing pressure, agitation, and water-to-coffee-ground ratio controls and/or capable of interfacing with a human user (e.g., a barista) to guide executing of the specific recipe for the coffee bean. For example, Blocks of first method S100 can be implemented by a coffee brewing machine incorporating the brewing system described in U.S. Patent Publication No. 2012/0186456, published on 26 Jul. 2012, which is incorporated in its entirety by this reference.

Figure 3:
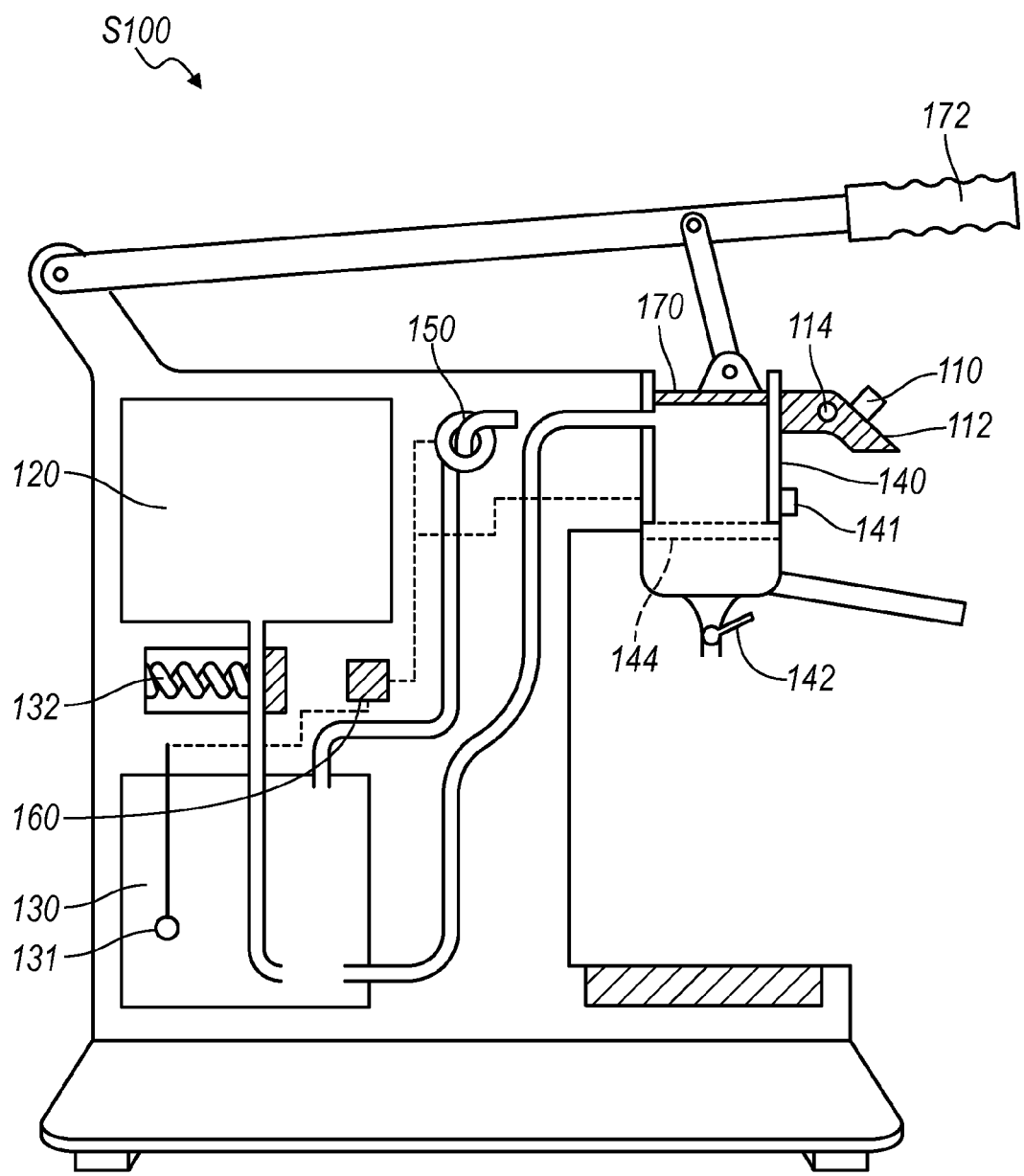
FIG. 3 is a schematic representation of a coffee brewing machine of one embodiment of the invention.

In another example shown in FIG. 3, the coffee brewing machine 100 includes an input module 110 for a receiving a coffee bean selection, a water reservoir 120, a boiler 130 that heats water received from the reservoir 120, a first temperature sensor 131 that measures water temperature in the boiler 130, a brew chamber 140 in which water is steeped with coffee grounds, a pump 150 that dispenses heated water into the brew chamber 140, heater that heats fluid in the brew chamber 140 during brew cycles, a second temperature sensor 141 that measures fluid temperature in the brew chamber 140, a valve 142 in the base of the brew chamber 140 to dispense fluid out of the brew chamber 140, a manually-operated piston 170 that forces fluid out of the brew chamber 140 through a filter between the valve 142 and the brew chamber 140, a display 112 that presents brewing instructions to a user, an audio driver 114 that delivers audible cues to the user, and a processor 160 that controls the foregoing components of the coffee brewing machine 100 to brew the selected coffee bean automatically or with manually assistance. In this example, the input module can include an optical sensor, and the processor 160 can communicate with the optical sensor to read a QR code on the coffee packaging, interface with a wireless communication module within the coffee brewing machine 100 to retrieve a coffee brewing recipe from a remote server based on the QR code, set brewing parameters based on the retrieved brewing recipe (and other measured or determined variables at or near the coffee brewing machine 100), and applies the coffee brewing parameters through the foregoing components of the coffee brewing machine 100 during the brew cycle.

However, the coffee brewing machine 100 can be of any other suitable form, such as a large professional coffee brewing machine for café use, an under-counter coffee brewing machine, or a small residential coffee brewing machine for a private or home use. The brewing machine can also source water from a plumbed line or tap into a commercial or residential plumbing system or from a reservoir within the brewing machine that is refilled manually.

Figure 2:
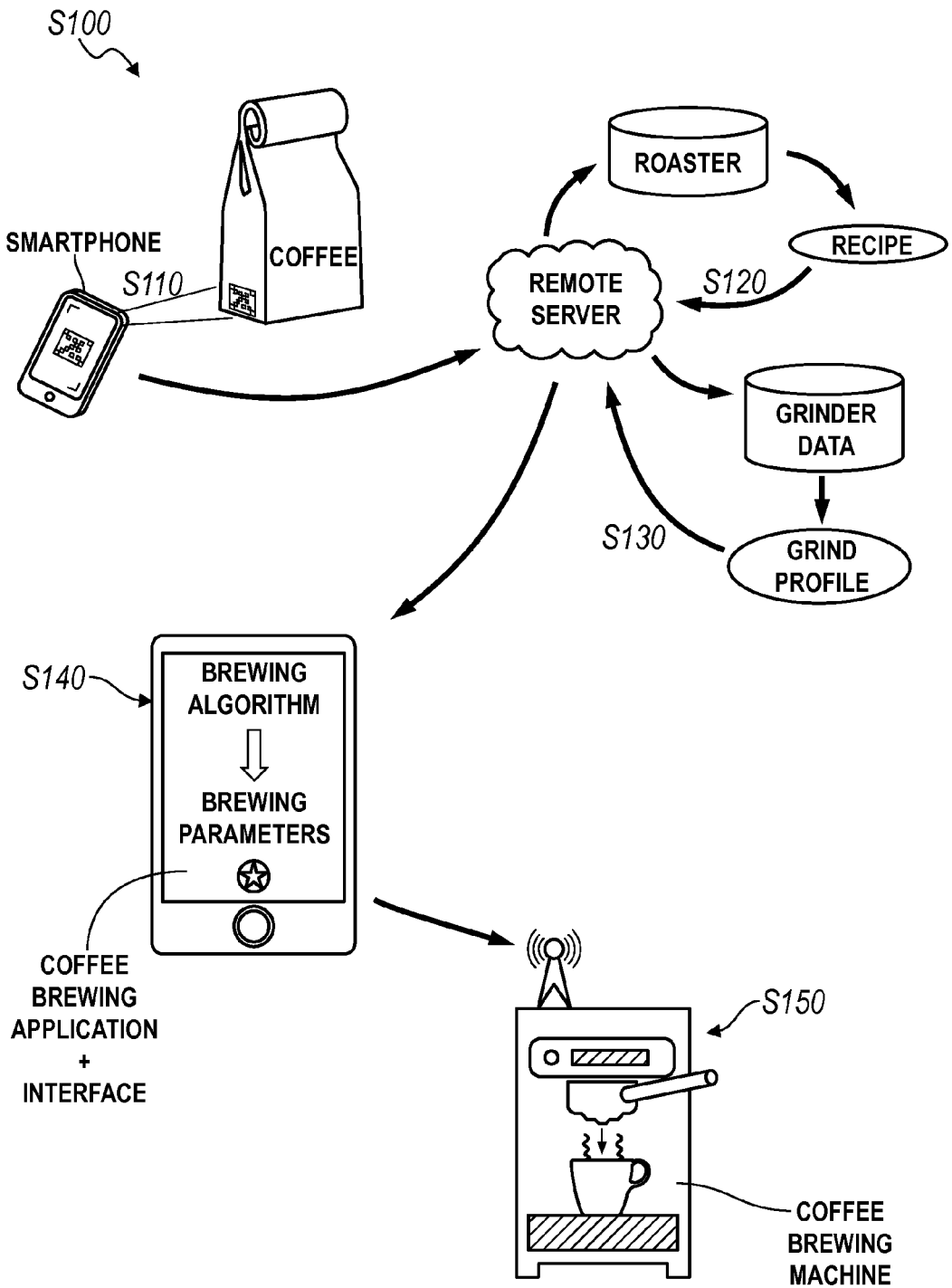
FIG. 2 is a flowchart representation of one variation of the method.

Alternatively, as shown in FIG. 2, one or more Blocks of first method S100 can be execute on a discrete computing device in communication with the coffee brewing machine 100. In one example in which the coffee brewing machine 100 is a residential coffee brewing machine, a user can open a native application (or an application within a web browser) executing on his mobile computing device (e.g., a smartphone, a tablet) to scan a QR code printed on a coffee bag, and the native application can transmit data extracted from the QR code to a remote server to retrieve the coffee brewing recipe and then upload the received recipe to the user's coffee brewing machine, such as over Wi-Fi, cellular, or Bluetooth communication protocol. Alternatively, the native application can trigger the remote server to push the recipe directly to the coffee brewing machine 100. The coffee brewing machine 100 can then execute other Blocks of first method S100 to brew the coffee bean according to the received recipe and/or brewing parameters. In this example, the native application can also handle wired or wireless communications with the coffee brewing machine 100 to track and store a serial number, a model number, age, total hours of use, gallons of water used, actual and target temperature of the boiler 130 and the brew chamber 140 in the coffee brewing machine 100, and/or other information pertaining to the coffee brewing machine 100. The native application can similarly access local information, such as time, weather, humidity, temperature, and location from sensors integrated into the mobile computing device (e.g., a thermistor, a global positioning system (GPS) sensor) and/or downloaded from a local weather tower or an online weather database. The native application can thus adjust brewing parameters for the upcoming brew cycle based on machine and environmental information. However, the mobile computing device and the coffee brewing machine 100 can cooperate in any other way to execute Blocks of first method S100.

Blocks of first method S100 can additionally or alternatively be implemented by a remote computer system, such as a remote server in communication with the coffee brewing machine 100 or with a network of coffee brewing machines linked through an Internet or Ethernet connection. The computer system can be a cloud-based computer (e.g., Amazon EC2), a mainframe computer system, a grid-computer system, or any other suitable computer system. For example, the computer system can be a remote server that communicates with one or more coffee brewing machines over HTTP (or TCP or UDP) protocols through a web service (e.g., Amazon AWS). The computer system can thus receive recipe, roaster, coffee brewing machine, coffee grinder, environmental, and other data from and transmit parameters, recipe information, etc. to the coffee brewing machine 100, a coffee grinder, a user's mobile computing device, etc., such as over an Internet, Ethernet, cellular, Wi-Fi, satellite, or other suitable connection. However, Blocks of first method S100 can be implemented by any other one or more devices and in any other suitable way.

3. Coffee Bean Identifier

Block S110 of first method S100 recites receiving a coffee source identifier. Generally, Block S110 functions to collect data identifying the coffee bean to be brewed and to pass these data to Block S120, which selects a particular brew recipe corresponding to the coffee bean for an upcoming brew cycle on the coffee brewing machine 100.

In one implementation, Block S110 automatically identifies a coffee bean from data collected from the packaging containing the coffee bean. In particular, in this implementation, Block S110 identifies the coffee bean that is to be brewed in the upcoming brew cycle by extracting identifying information directly from the coffee bean packaging—such as from a one-pound coffee bag or from a coffee tin—containing whole coffee beans or coffee grounds. As described below, Block S110 can cooperate with Block S120 to extract or retrieve a recipe for the coffee directly from the packaging containing the coffee bean. Alternatively, Block S110 can retrieve a coffee source identifier—such as a serial number or address unique to the packaging, the coffee bean roast batch, or to the roaster supplying the coffee bean—and Block S120 can reference the coffee source identifier to a local or remote database of coffee beans to identify the specific coffee bean and to retrieve the corresponding recipe.

In this implementation, Block S110 downloads a coffee source identifier from a radio frequency identification (RFID) tag, a near-field communication (NFC) tag, or any other suitable wireless transmitter arranged on the packaging. For example, the coffee brewing machine 100 can include an RFID reader, an NFC reader, or an other radio-based wireless scanner or receiver, and Block S110 can interface with this receiver to collect the coffee source identifier from the coffee packaging, such as when a user swipes the coffee packaging over the receiver. In particular, Block S110 can cooperate with Block S120 to download the recipe directly from wireless transmitter arranged on the coffee bean packaging. Alternatively, Block S110 can download a unique code (e.g., an alphanumeric sequence) from the wireless transmitter arranged on the coffee bean packaging and pass the code to a remote server that identifies and selects the corresponding recipe, and Block S120 can then receive the recipe back from the remote server. In this implementation, Block S110 can similarly execute on or interface with a receiver integrated into a user's mobile computing device to retrieve the coffee source identifier from the coffee bean packaging.

Alternatively, in this implementation, the coffee brewing machine 100 includes an optical sensor (e.g., a camera), and Block S110 interfaces with the optical sensor can capture an input of the coffee bean packaging and implements machine vision to identify a QR code, a bar code, a serial number, or other coffee source identifier printed on or applied to the packaging. For example, Block S110 can implement optical character recognition to extract coffee-related information from an image of a portion of the bag on which the QR code, bar code, or serial number, etc. is arranged. In this example, Block S110 can control the optical sensor to automatically capture the image when a user holds the coffee packaging in front of the optical sensor. Block S110 can thus cooperate with Block S120 and the optical sensor to read the recipe directly off of the packing. Block S110 can alternatively read the coffee source identifier, such as a name, a roast batch number, a roaster, a roast date, and/or a serial number, directly off of the packaging, and Block S120 can pass any one or more of these data to local memory or to a remote server to collect the corresponding recipe. Similarly, Block S110 can identify a code arranged on the packaging in the image, such as a barcode or a QR code, and translate the identified code into coffee source identifier (e.g., an alphanumeric sequence), and Block S120 can similarly handle the coffee source identifier to collect the recipe for the coffee bean. For example, Block S110 can read a quick-response code applied onto the coffee bag with an optical sensor coupled to the coffee brewing machine 100 and identify a coffee roaster supplying the coffee bean and a roast date of the coffee bean from the quick-response code, and Block S120 can download the recipe assigned to the coffee bean for the roast date by the coffee roaster.

In another implementation, Block S110 cooperates with the input module 110 to receive manual entry of a name, an identification number, a batch number, a serial number, or any other suitable coffee source identifier related to the coffee bean selected from the upcoming brew cycle. For example, the coffee brewing machine 100 can include a display 112 and a discrete input region (e.g., a switch or button), and Block S110 can control the display 112 to render a menu of coffee bean recipes stored locally on the coffee brewing machine 100. In this example, the display 112 can cycle through the available recipes based on inputs into the input region, and Block S120 can retrieve a recipe corresponding to a selection by the user. Thus, as in this example, Block S110 can receive a manual selection for the coffee bean from a list of coffee beans. Block S110 can similarly control a touchscreen or an analog interface on the coffee brewing machine 100 to collect a manual selection of a particular coffee bean affiliated with a brewing recipe stored locally or remotely. Block S110 can also interface with the user's mobile computing device to receive a selection for the coffee bean. Alternatively, Block S110 can receive manual entry of a code, such as a numeric or alphanumeric code printed directly onto the packaging or printed onto a sticker applied to the packing. However, Block S110 can receive an identifier of the whole or pre-ground coffee bean in any other suitable way.

Figure 5:
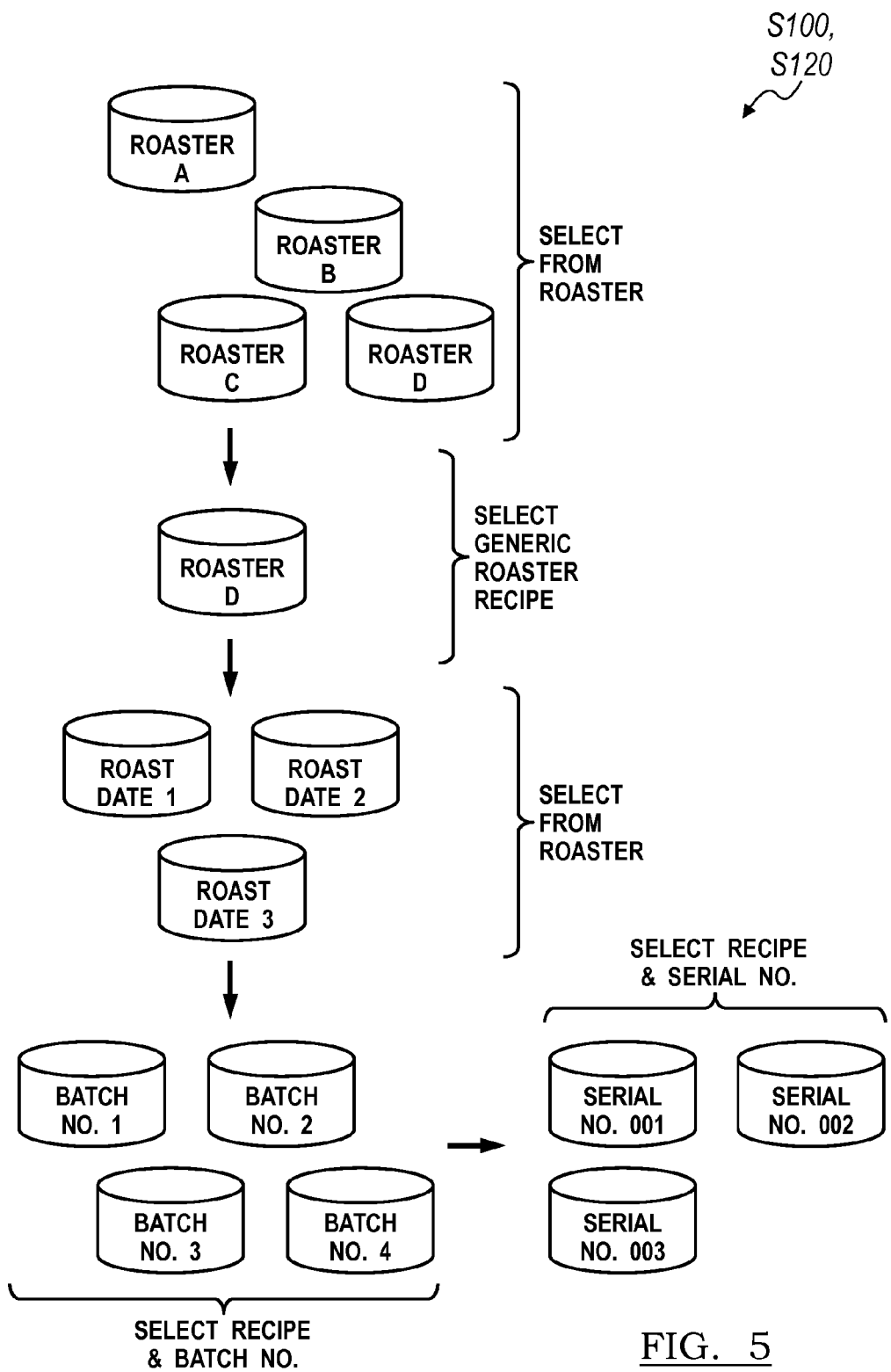
FIG. 5 is a flowchart representation of one variation of the method.

In any of the foregoing implementations, Block S110 can receive the coffee source identifier that defines a pointer to a particular coffee bean (e.g., a particular roast) from a particular coffee roaster, a roast date of the particular coffee bean, a batch roast number of the particular coffee bean, and/or a serial number of the packaging containing the particular coffee bean. Block S110 can thus receive one or more levels (or resolutions) of identifiers of the coffee bean to be brewed in the upcoming brew cycle, such as shown in FIG. 5. In particular, Block S110 can handle the coffee source identifier defining one of more of a general type of roast that is common to thousands of pounds of beans from the roaster annually, a date of roast that is common to hundreds of pounds of beans roasted by the roaster on one day (or week or other roast period), a roast batch number that is unique to fifteen pounds (15 lbs.) of coffee beans, or a coffee packaging serial number that is unique to one pound (or any similar quantity) of coffee beans. However, Block S110 can collect, extract, and/or receive the coffee source identifier defining any other identifier for the coffee bean in any other format.

4. Recipe

Block S120 of first method S100 recites retrieving a recipe for brewing a coffee bean based on the coffee source identifier. (Block S120 of first method S100 can similarly recite retrieving a recipe for the coffee bean, the recipe specified by a roaster associated with the coffee bean.) Generally, Block S120 functions to access a particular coffee brewing recipe specific to the coffee bean—as specified by a coffee roaster—based on the coffee source identifier collected in Block S110.

As described above, the recipe can be defined by the roaster as a target experience for a cup of coffee brewed from the particular coffee beans. Because each coffee bean harvest can be different, because each roaster can roast beans differently, because the same roaster can roast batches of beans differently, and because variations may exist even amongst beans within the same roast batch from the same roaster and sourced from the same coffee bean harvest, the target experience can be generic to one coffee roast supplied by the roaster (e.g., all dark roast from the roaster), specific to one coffee roast supplied by the roaster for one coffee harvest or coffee season, specific to one roast date (e.g., a day or week) for coffee beans from the roaster, specific to one roast batch number for coffee beans from the roaster, or specific to a single package of coffee beans from the roaster.

Generally, the recipe can define a set of quantitative (and qualitative) brewing parameters to (e.g., brew temperature, brew temperature profile, brewing duration, brew or initial water volume, coffee ground contact time with water per unit area, filter medium, filter size, brewing pressure, coffee grind profile, agitation profile, coffee ground-to-water ratio, water quality, user prompts or alarms, recipe expiration date, etc.) that, when executed (within a certain tolerance), achieve a target tasting experience (e.g., flavor, aroma, caffeine content, acidity, bitterness, sweetness, aftertaste, approach, body, finish) from a cup of coffee brewed with the coffee bean.

In one implementation, the recipe specifies a static base set of brewing parameters including a brew temperature, start and stop times for agitation, and a steep time (i.e., a time from initiation of a brew cycle to dispensation of fluid from the brew chamber 140). Subsequent Blocks of first method S100 can thus execute this limited set of brewing parameters for each brew cycle in which the corresponding coffee bean is used, such as automatically through actuators and sensors incorporated into the coffee brewing machine 100 or by guiding manual execution of one or more brewing parameters at the coffee brewing machine 100 during the brew cycle, as described below. The recipe can also specify a particular filter type and/or size to brew the coffee bean, such as a metal filter or a paper filter of a particular porosity and/or flow rate, as well as additional agitation periods and/or types of agitation, such as stirring or punching (i.e., pushing floating particulate downward, or "breaking the crust"). The recipe can further define a grind profile for coffee beans, such as a grind size and/or a threshold deviation of particulate size in the coffee grounds from the grind size.

In the foregoing implementation, the coffee brewing machine 100 can be preset to meter a particular volume of water from the boiler 130 into the brew chamber 140 for all brew cycles, and all brew cycles can be specify a static volume or weight of coffee grounds. Alternatively, the recipe can specify a specific ratio of coffee grounds to water (e.g., by mass, weight, or volume ratio). The recipe can thus specify an algorithm for calculating a particular mass, weight, or volume of coffee grounds for dispensation into the brew chamber 140 during a brew cycle for the preset static brew volume of the coffee brewing machine 100. Similarly, a subsequent Block of first method S100 can receive a final brew volume (i.e., a final volume of brewed coffee dispensed from the brew chamber 140 during a brew cycle), and the recipe can define an algorithm for calculating an amount of water and an amount of coffee grounds for dispensation into the brew chamber 140, such as based on a target ratio of coffee grounds to water during the steeping period and a water retention capacity of the grounds (e.g., a volume of water retained per unit weight of dry grounds).

The recipe can further include one or more algorithms for calculating or adjusting final brewing parameters (e.g., agitation type and time, steep time, brew temperature or profile, etc.) based on additional variables, such as grind profile or distribution, bean age, location, barometric pressure, ambient air temperature to account for additional factors that may effect flavor of coffee brewed with the coffee beans. For example, the recipe can specify algorithms than adjust brewing parameters based on a make and model, hours, and/or grinder settings of a local (e.g., adjacent or connected) coffee grinder, based on a location of the coffee brewing machine 100, which may indicate available water quality, elevation or barometric pressure, based on the ambient air temperature, or based on the make and model of the coffee brewing machine 100. Subsequent Blocks of first method S100 can thus normalize brewing parameters for the upcoming brew cycle to account for any one or more of these variables. In this example, the recipe can include ambient environmental conditions and brewing parameters used by the roaster when formulating the recipe for the coffee bean, such as brew time, brew temperature, brew pressure, agitation time(s) and type(s), and water-to-coffee-ground ratio. Subsequent Blocks of first method S100 can define these parameters as baseline parameters and then adjust the baseline parameters according to one or more algorithms in the recipe based on differences between the ambient environmental conditions during formulation of the recipe and present ambient environmental conditions at the coffee brewing machine 100 in preparation for the upcoming brew cycle.

Figure 4:
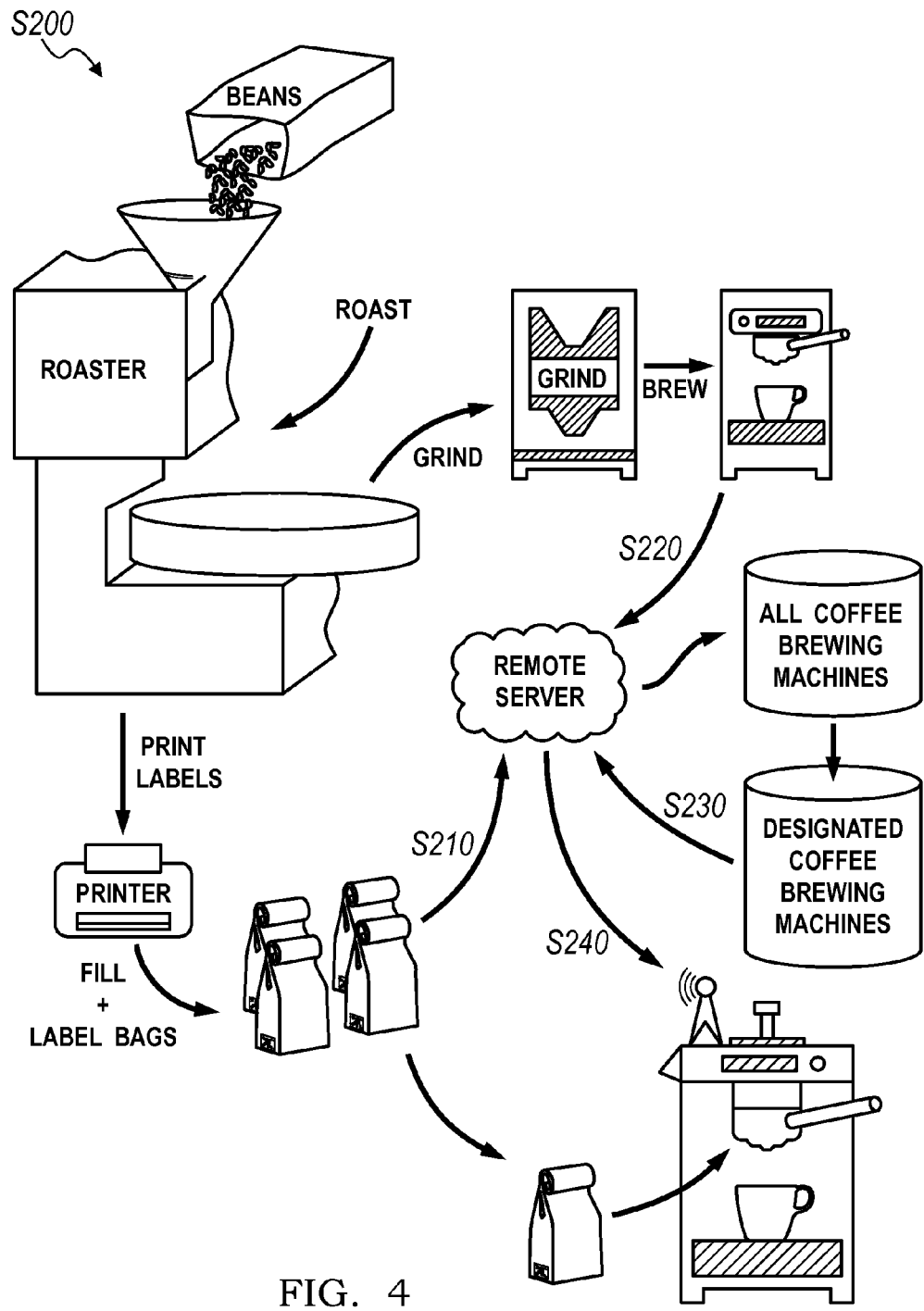
FIG. 4 is a flowchart representation of one variation of the method.

As shown in FIG. 4, in one example process flow, the roaster roasts a batch (e.g., 100 lbs.) of coffee beans and dials in a recipe for the batch by brewing and tasting various cups of coffee with coffee beans from the batch. The roaster then uploads the recipe specific to the batch to a server and prints sticky labels with QR codes that point to the recipe. The roaster then applies the sticky labels to 1 lb. paper coffee bags and fills the bags with whole coffee beans from the roast batch. A customer (e.g., a coffee buyer for a café) then purchases one of the 1 lb. bags of coffee. When the QR code on the bag is later read with a scanner integrated into the coffee brewing machine 100, the coffee brewing machine 100 executes Block S110 to identity the batch number of the coffee bean in the bag and executes Block S120 to retrieve the recipe from the remote server before implemented the recipe in subsequent Blocks of first method S100 to brew a cup of coffee with the coffee bean.

As in the foregoing example process flow, Block S110 can receive the identifier directly from a tag or other wireless transmitter arranged on the coffee packaging, or Block S110 can extract the identifier from the coffee packaging, such as by implementing machine vision techniques to read a code from an image of the packaging as described above. Block S120 can then apply the identifier to a local or remote database of recipes to retrieve a particular recipe specific to the coffee bean selected for the upcoming brew cycle. In this implementation, because the recipe is stored electronically and separate from the coffee packaging (e.g., on a remote server), the roaster can update, modify, or tweak the recipe over time, and Block S120 can retrieve the current (i.e., most up-to-date) recipe specific to the beans to be roasted. Similarly, as in the second method described below, when the roaster enters or modifies a brew recipe for a particular coffee bean, the new or updated brew recipe can be pushed automatically to existing coffee brewing machines, such as to specific coffee brewing machines affiliated (e.g., through contract) with the roaster and/or designated for brewing the particular coffee bean.

However, Block S110 can receive an identifier for the coffee bean in any other way and in any other format, and Block S120 can function in any other way to retrieve the recipe specific to the coffee bean.

5. Grind Profile

One variation of first method S100 includes Block S130, which recites identifying a grind profile of the coffee bean. Generally, because grind profile can affect flavor of a cup of coffee, Block S130 functions to estimate an average grind size and standard deviation (i.e., a grind profile distribution) of coffee grounds ground from the coffee bean. In one implementation, Block S130 interfaces with an optical sensor to collect an image of dry grounds and implements machine vision to estimate average grind size and standard deviation of the coffee grounds from the image. For example, an optical sensor integrated into the coffee brewing machine 100 or into the user's mobile computing device can capture an image of grounds prior to dispensation of the grounds in the brew chamber 140 of the coffee brewing machine 100.

Alternatively, Block S130 can estimate the grind profile of the coffee bean based on the make, model, and/or age (e.g., hours of use) of a coffee grinder near the coffee brewing machine 100 and used to grind the coffee bean. For example, Block S130 can pass a make and model of the coffee grinder to a remote database container coffee grinder data and thus retrieve a particular shape, size, and/or orientation of burrs equipped in the particular coffee grinder used to grind the current coffee bean. For example, a coffee grinder equipped with flat burrs may produce a tighter grind profile than a coffee grinder equipped with round burrs, a coffee grinder equipped with vertically-oriented burrs may produce a tighter grind profile than a coffee grinder equipped with horizontally-oriented burrs, and a coffee grinder equipped with larger burrs may produce a tighter grind profile than a coffee grinder equipped with smaller burrs. Block S130 can thus predict the grind profile of coffee grounds output from the coffee grinder according to these burr parameters. Block S130 can also retrieve a coradiality, a burr material (e.g., sintered ceramic or ground steel), burr coating, burr type (e.g., crushing or cutting), burr age, and/or a date of most recent burr-replacement at the coffee grinder and estimate the grind profile of the coffee grounds accordingly.

Figure 6A:
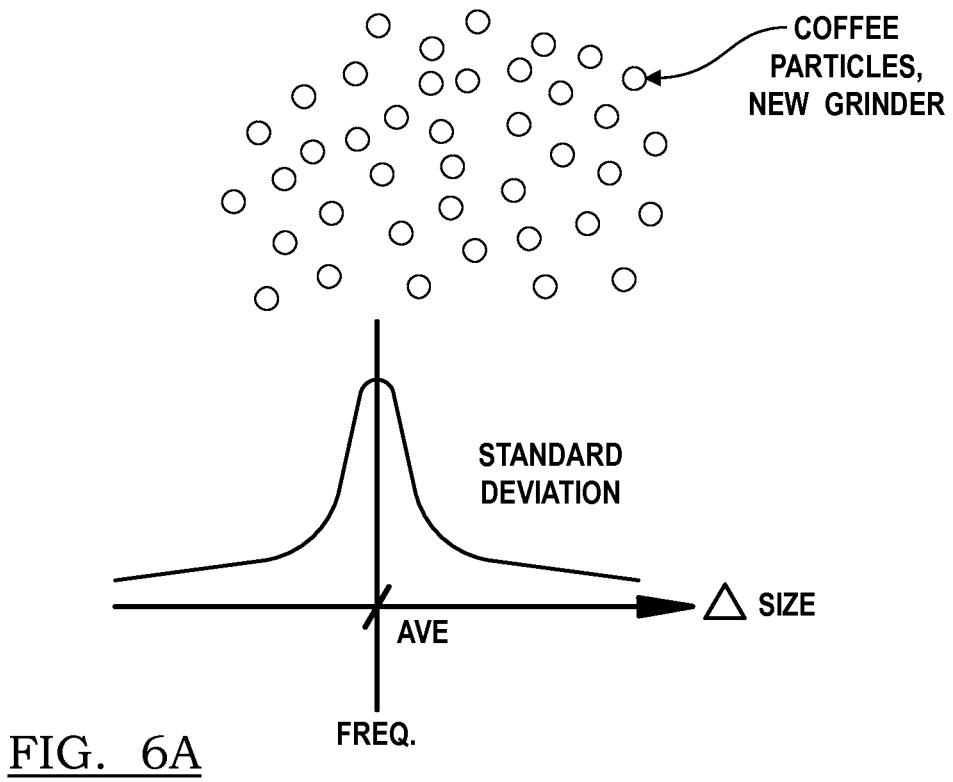
FIGS. 6A and 6B are graphical representations of one variation of the method.
Figure 6B:
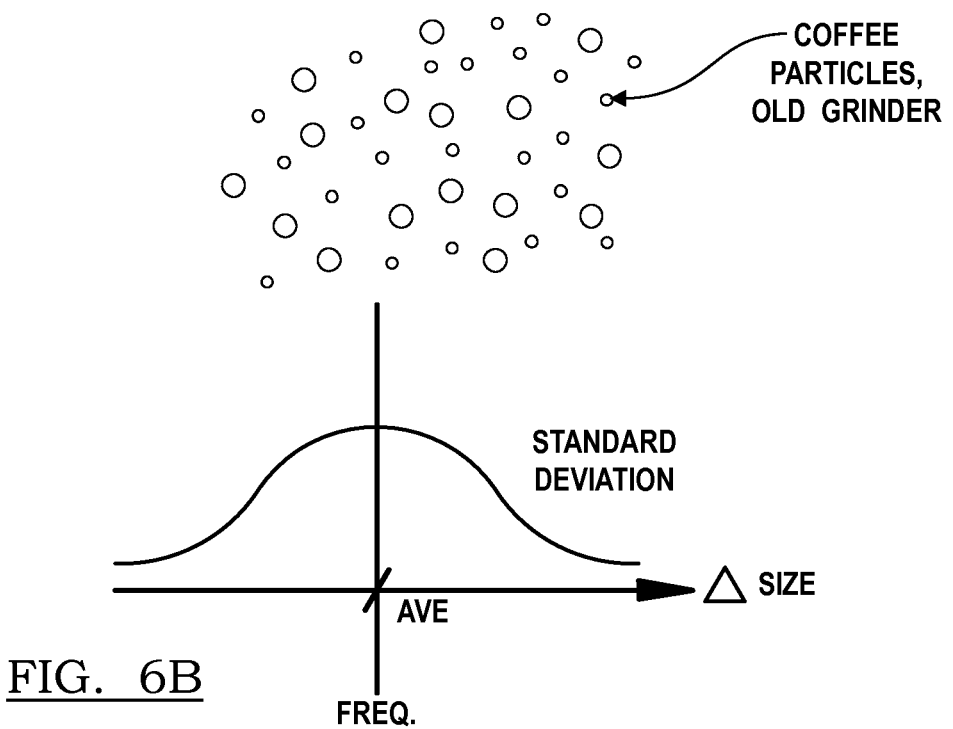

In particular, grind profile standard deviation can be very high for brand new burrs and decrease as the burrs are "broken in." However, as the coffee grinder continues to be used, the burrs eventually begin to wear out, thus yielding increasingly less uniform grind sizes. For example, once a new coffee grinder is broken in, it may yield grind profiles with relatively small standard deviations (such as shown in FIG. 6A), and older coffee grinders (i.e., coffee grinders with many hours of use) can yield grind profiles with relatively large standard deviations (such as shown in FIG. 6B). Block S130 can thus implement an algorithm or model linking grind profile standard deviation to coffee grinder age or use to estimate the grind profile distribution of the coffee grounds prior to brewing. For example, Block can implement a generic coffee grinder wear model to estimate grind profile standard deviation of grounds output from any coffee grinder. Alternatively, because coffee grinders from different manufacturers or different models of coffee grinders from the same manufacturer may wear differently, Block S130 can access a grinder wear model specific to the particular grinder used to grind the coffee bean prior to the brew cycle, such as by retrieving the grind model from a remote server based on a grinder make, model, and/or serial number entered into the user's mobile computing device or into the coffee brewing machine 100 manually or collected automatically from the grinder over wireless communication.

In the foregoing implementation, Block S130 can interface with a wireless communication module with the coffee brewing machine 100 (or within the user's mobile computing device) to download a make, model serial number, and/or hours of operation directly from the coffee grinder, such as over Wi-Fi or Bluetooth communication protocol. Alternatively, Block S130 can receive a manual entry of grinder hours of operation or other related data and estimate the grind distribution of grounds output from the coffee grinder. Block S130 can thus predict a grind profile for the coffee bean that is ground fresh and local to the coffee brewing machine 100, that is ground at a particular machine or by a particular grocer, coffee distributor, or roaster, etc.

Alternatively, the roaster can grind the coffee bean and dispense coffee grounds into the coffee packaging prior to sale. In this process flow, Block S130 can communicate with the roaster to retrieve grind profile data for the coffee bean, such as by downloading a grind data uploaded by the roaster to a grind database accessible by the coffee brewing machine 100 over the Internet. Block can similarly retrieve coffee grinder make, model, and/or hours of operation data from a grinder user by the roaster to grind the coffee to estimate the grind profile for the pre-ground beans, such as with a method described above.

Block S130 can also prompt the user to grind the coffee bean to a particular size. For example, Block S130 can prompt a user to grind the coffee bean to a particular size specified in the recipe (e.g., a size selected by the roaster and stored with the recipe). In this example, Block S130 can interface with a digital display 112 incorporated into the coffee brewing machine 100 to render an instruction for selecting a particular grind size at a local coffee grinder. Block S130 can also interface with the digital display 112 to render an instruction for dispensing a particular weight of coffee grounds (of the particular grind size) into the brew chamber 140, such as based on the ratio of coffee grounds to water specified in the recipe and/or based on a final brew volume selected by the user. Block S134 can similarly transmit a grind setting and/or a coffee grind weight to a local coffee grinder, such as a grind setting specified in the recipe and a grind weight based on the selection for the final brew volume.

Block S130 can also adjust the prompted grind size according to the measured or estimated grind profile distribution from the local coffee grinder. Block S130 can additionally or alternatively cooperate with other Blocks of first method S100 to adjust the prompted grind size to accommodate for other variables (e.g., ambient temperature, water quality) or to adjust other brewing parameters to compensate for an available ground size and distribution from the grinder. However, Block S130 can identify a grind profile of the coffee bean, prompt the user to grind the coffee bean to a particular grind size, or automatically set an output of a local coffee grinder in any other suitable way.

6. Fully-Automated Brewing

In one variation, first method S100 executes brew parameters defined in the recipe and/or refined in Block S140 described below by interfacing with various sensors and actuators within the coffee brewing machine 100 to automatically brew the selected coffee bean, as shown in FIG. 1. For example, a coffee brewing machine executing this variation of first method S100 can be installed in a residential setting to automatically—or with limited human involvement—brew coffee for an individual in his home.

In this variation, first method S100 can include Block S140, which recites setting brewing parameters based on the recipe and the grind profile of the coffee bean. Generally, Block S140 functions to adjust brewing parameters specified by the recipe for the upcoming brew cycle to compensate for any number of variables that may affect flavor of the brewed coffee, such as grind profile, freshness of grind, age of beans, local barometric pressure, local humidity, local ambient temperature, and water quality used to brew the cup of coffee. In particular, Block S140 can adjust brewing parameters set in by the recipe to achieve a coffee experience intended by the coffee roaster despite differences in local conditions (i.e., variables) leading up to the brew cycle.

For example, as described above, Block S140 can set brewing parameters defined in the recipe retrieved in Block S120 as baseline parameters and adjust these parameters according to differences between current conditions and conditions during the formulation of the recipe. For example, Block S140 can normalize the roaster's recipe to the current conditions at the coffee brewing machine 100 according to environment conditions, grind profile, water quality, age of the coffee bean, freshness of the grind, etc.

In one example implementation, Block S140 adjusts brewing parameters for the upcoming brew cycle to account for local barometric pressure near the coffee brewing machine 100. For example, because the free boiling point of water is proportional to barometric pressure, and Block S140 can decrease a peak or average brew temperature in response to lower detected or received barometric pressure near the coffee brewing machine 100. In this example, responsive to the lower peak or average brew temperature, Block S140 can increase brew duration and/or agitation accordingly. Furthermore, because barometric pressure can be linked to altitude and altitude linked to location, Block S140 can determine the location of the coffee brewing machine 100, such as by polling a GPS sensor in the coffee brewing machine 100 or a GPS sensor in the user's mobile computing device, and Block S140 can then access an average local barometric pressure for the location, such as from a lookup table. Alternatively, Block S140 can interface with a pressure sensor incorporated into the coffee brewing machine 100 to measure the local barometric pressure directly, or Block S140 can communicate with a weather tower to retrieve a local barometric pressure reading. However, Block S140 can receive local barometric pressure and adjust brewing parameters accordingly in any other suitable way.

In another example implementation, Block S140 adjusts brewing parameters to account for the ambient air temperature proximal the coffee brewing machine 100. In one example, Block S140 assumes that the temperature of the ground coffee bean is approximately the same temperature as the ambient air temperature, and, for lower detected ambient air temperatures, Block S140 extends the brew duration (i.e., steep time) and softens a temperature ramp profile within the brew chamber 140 to prevent temperature shock to the coffee grounds. Alternatively, for lower ambient air temperatures, Block S140 can set a faster temperature ramp in the brew chamber 140 to accommodate the brew chamber 140, water, and/or coffee grounds that are initially cooler in order to minimize contact between the grounds and the water outside of a particular temperature range. Block S140 can also adjust a steeping period (and an alarm to notify the user that the cup of coffee is ready) according to a predicted thermal energy flux from the brew chamber 140 based on ambient air temperature, a type of coffee cup (e.g., ceramic, paper) to be used, etc. In one example, Block S140 interfaces with a thermistor or other temperature sensor within the coffee brewing machine 100 or within the user's mobile computing device to detect the ambient air temperature proximal the coffee brewing machine 100. However, Block S140 can receive ambient air temperature and adjust brewing parameters accordingly in any other suitable way.

In yet another example implementation, Block S140 adjusts brewing parameters to account for a quality of water in use at the coffee brewing machine 100. In particular, tap and bottled water may contain various minerals that affect flavor, such as calcium, magnesium, sodium, potassium, chloride(s), zinc, iron, copper, and fluoride, and Block S140 can adjust brewing parameters to account for differences in water used by the roaster and water used at the coffee brewing machine 100. For example, for water with relatively high mineral content, Block S140 can reduce both brewing (i.e., steeping) time and average brew temperature to curb chemical reactions between metals in the water and acids in the coffee grounds, which can yield salts that affect the flavor of the coffee and/or upset an acid balance in the coffee. In this example, Block S140 can also cooperate with Block S130 to prompt the user to use a finer grind to account for the reduced brew time and brew temperature without substantially sacrificing body of the coffee. In a similar example, Block S140 can set a brewing time and a brewing temperature according to an amount of dissolved solids in the supplied water, which can affect solvent efficiency of the supplied water. Additionally or alternatively, Block S140 can set higher brew pressures to accommodate for the reduced brew time and temperature. Block S140 can also interface with a water mineral sensor integrated into the coffee brewing machine 100 to determine the mineral content of the water, or Block S140 can access a tap water profile database to retrieve tap water data based on the location of the coffee brewing machine 100. Alternatively, the user can enter a type of bottled water or scan a barcode on a bottle of water used to brew the coffee, and Block S140 can access a bottled water profile database to retrieve water quality data for the selected bottled water. However, Block S140 can receive any other water quality data and adjust brewing parameters accordingly in any other suitable way.

In another example implementation, Block S140 adjusts brewing parameters to account for the grind profile of the coffee bean. In particular, the grind profile—or the average size and standard deviation of particles ground from coffee beans—may affect which and to what extent flavors are extracted from each ground over time during a brew cycle. For example, grounds that are smaller or larger than a target size range can yield undesirable or imbalanced flavors, since grounds that are too small may have been severed from particulate that yields complementary flavors and grounds that are too large limit may predominantly yield flavors that stem from larger molecules, thereby upsetting flavor balance of the brew. In particular, ground size can affect permeability of the grounds, thereby affecting the flavor of coffee brewed within the grounds. Therefore, Block S140 can adjust brewing parameters (e.g., brewing duration, agitation, brew temperature profile, brewing pressure) to control water-to-ground contact time, thereby controlling flavor extraction from the grounds for the current grind profile. For example, for a grind profile with a proper average ground size but a standard deviation of ground size outside of a threshold standard deviation, Block S140 can increase brewing duration and decrease average brew temperature to selectively extract more flavors from larger grounds during brewing. In another example, for a grind profile with an average ground size greater than a preferred ground size but a proper standard deviation of ground size, Block S140 can increase average brew temperature, increase agitation, and increase brewing pressure to extract more balanced flavors from the grounds. However, Block S140 can receive a grind profile of the coffee bean and adjust brewing parameters accordingly in any other suitable way.

In the foregoing example, implementation, Block S140 can also adjust brewing parameters to account for the age of the coffee bean and/or the freshness of the grounds. In particular, a whole bean may degrade and become stale over time, thus resulting in diminished flavors in a brew. Degradation of flavor from the coffee bean may be further exacerbated if the bean is stored ground rather than whole. Therefore, Block S140 can implement a degradation algorithm—such as specific to a coffee bean and stored configuration (i.e., whole or ground)—to model changes in flavors extractable from the coffee bean based on age of the coffee bean (i.e., time since roasting). Block S140 can also access a coffee bean or roaster database to determine an age of the coffee bean based on the roast date, batch number, or a "ready" date (i.e., a number of specified rest days following the roast date). Alternatively, Block S140 can interface with Block S110 to extract a roast or ready date directly from the coffee packaging. In one example, for an older and relatively degraded bean, Block S140 can increase brewing duration, average brew temperature, and average brewing pressure in order to extract more flavor from the bean to compensate for a decrease in extractable flavors from the bean over time. Similarly, Block S140 can prompt the user to fill the brew chamber with a larger amount (e.g., volume, mass, or weight) of grounds to compensate for older whole coffee beans (e.g., more than two weeks old) or for coffee grounds that were ground outside of a preferred flavor window (e.g., more than 24 hours prior). Block S140 can also throw a warning and/or notify the user if the coffee bean is too old to yield a cup of coffee that achieves the coffee experience specified by the roaster. However, Block S140 can receive an age of the coffee bean and adjust brewing parameters accordingly in any other suitable way.

In another implementation, Block S140 can adjust the brewing parameters to account for a mass of grounds to be brewed, such as by setting a volume of water to be added to the brew chamber 140 in Block S154 based on the amount of coffee grounds to be brewed. For example, Block S140 can receive a ratio of water (e.g., in grams) to coffee grounds (e.g., in grams) from the recipe, interface with a scale integrated into the brew chamber 140 to measure a mass of grounds added to the brew chamber 140, and calculate the volume of water to add to the brew chamber 140 based on the water-to-grounds ratio and the mass of grounds. Alternatively, Block S140 can receive manual entry of ground mass entered by a user. Yet alternatively, a user can load grounds into the brew chamber 140 with a scoop or known volume, and Block S140 can estimate the mass of grounds based on manual entry of the number of scoops and a known or estimate density of the coffee ground, such as a density specific to the particular coffee bean as measured by the roaster.

Block S140 can also account for changes in moisture content of the coffee bean over time (e.g., based on the degradation algorithm described above), water absorption volume of the grounds, water absorption rate of the grounds (e.g., based on the grind profile), etc. to estimate a ratio of water added to the brew chamber 140 to water released from the brew chamber 140 upon completion of the brew cycle. For example, Block S140 can receive a manual entry or user selection of a volume final brew volume (e.g., 4 oz., 8 oz., six cups), calculate a mass of grounds to add to the brew chamber 140, instruct the user to add the mass of grounds to the brew chamber 140, and set a volume of water to add to the brew chamber 140 accordingly. However, Block S140 can receive, estimate, or measure a mass of grounds for consumption during the brew cycle and/or receive a selection for a volume of coffee to output during the brew cycle and adjust brewing parameters accordingly in any other suitable way.

Block S140 can further set a pre-wetting and/or water ingress pulse parameters for dispensing water in to the brew chamber 140. For example, Block S140 can set a pre-wetting parameter to add a first 50 g of water the brew chamber 140 in Block S154 and to set a soak timer for the grounds. In another example, Block S140 can set a water ingress pulse parameter to add a first 50 g of water at a first time, pause for ten seconds, and then add 250 g of water at a specified interval and flow rate up to a total initial water volume (i.e., based on a determined ratio of water in to coffee out) in Block S154. However, Block S140 can function in any other way to set any other brewing parameter.

In this variation, first method S100 can also include Block S150, which recites controlling a coffee brewing machine according to the brewing parameters to brew the coffee bean. Generally, Block S150 functions to implement brewing parameters set in Block S140 to brew the coffee bean by monitoring sensors integrated into the coffee brewing machine 100 and controlling actuators within the coffee brewing machine 100 accordingly.

Initially, Block S150 heats water in a boiler 130 to a target temperature and then actuates the pump 150 to dispense a volume of water—set in Block S140—into the brew chamber 140. For example, Block S150 can control a pump to displace water from the boiler 130 into the brew chamber 140, interface with a flow sensor arranged along a fluid supply line to the brew chamber 140 to measure the volume of water displaced into the brew chamber 140, and then power off the pump when the desired dispensed water volume is reached.

Once water and grounds are both dispensed into the brew chamber 140, Block S150 implements closed-loop feedback to control a heating element coupled to the brew chamber 140 to maintain the temperature of fluid within the brew chamber 140 based on outputs of a temperature sensor 141 coupled to the brew chamber 140 and a brew temperature set in Block S140. For example, Block S150 can control the heating element and the plunger 170 arranged over the brew chamber 140 to implement heating and pressure profiles set in Block S140 based on outputs of a temperature sensor 141 (e.g., a thermocouple, a contactless laser-based temp sensor) and a pressure sensor arranged in the brew chamber 140, respectively. In this example, Block S150 can control the heating element according to a time-dependent temperature profile, such as by initially increasing the temperature of the grounds and water in the brew chamber 140 from room temperature to a preset target temperature of 195° F. over a preset period of time and holding the temperature at 195° F. for a subsequent preset period of time. Block S150 can also control an impeller, ultrasonic transducer, or other agitator arranged in or in communication with the brew chamber 140 according to an agitation profile parameter set in Block S140. In this example, Block S150 can control the agitator according to a time-dependent agitation profile, such as by agitating the water and grounds in the brew chamber 140 for a first period of time (e.g., thirty seconds) during the brew cycle and then ceasing agitation for the remainder of the brew cycle.

Finally, when a water-ground contact period completes—as specified in Block S140—Block S150 can control a valve 142 coupled to the brew chamber 140 to dispense fluid (i.e., brewed coffee) from the brew chamber 140 into a coffee cup, a coffee pot, a thermos, or any other container.

Block S150 can also implement a post-brew rest period parameter set in Block S140 to notify a user that the coffee is ready to drink or distribute. For example, Block S140 can specify that the coffee should rest for 90 seconds after brewing and before consuming, such as based on an optimal consumption temperate set by the roaster and an anticipated cooling time related to an ambient air temperature near the coffee brewing machine 100. Thus, Block S150 can implement the brewing parameters set in Block S140 to reduce a possibility of human error during a brew cycle and to enable substantially accurate and repeatable brewing results.

Alternatively, Block S150 can interface with sensors and actuators arranged within the coffee brewing machine 100 to implement brew parameters defined explicitly within the or to implement a combination of brew parameters defined in the recipe and refined in Block S140. However, Block S150 can function in any other suitable way to control a coffee brewing machine according to brewing parameters—assigned to the coffee bean and/or manipulated in Block S140 according to local parameters and/or user inputs—to brew the coffee bean.

However, in this variation, Blocks of first method S100 can function in any other way to automatically implement parameters specified in a recipe for a particular coffee bean selected for brewing on a coffee brewing machine.

7. Semi-Automated Brew Cycle

In another variation, first method S100 interfaces with various sensors within the coffee brewing machine 100, controls a set of actuators within the brewing machine to implement a subset of brewing parameters for the brew cycle, and presents instructions (i.e., prompts, directives) to the user to implement remaining brewing parameters for the brew cycle, as shown in FIG. 7. This variation of first method S100 can therefore control specific variables of a brew cycle, such as brew temperature, and guide a user through operation of the coffee brewing machine 100 to replicate a coffee experience defined by the corresponding roaster without eliminating a manual component of coffee brewing. In particular, in this variation, first method S100 can control some brewing variables automatically while guiding manual control of other brewing variables to maintain human involvement and an appearance of a trained, professional barista operating the coffee brewing machine 100 to brew coffee. For example, a coffee brewing machine executing this variation of first method S100 can be installed in a coffee shop or café and used by professional baristas to brew coffee from patrons.

This variation of first method S100 includes Block S142, which recites initiating a brew cycle. Generally, Block S142 functions to begin the brew cycle by locking brewing parameters, such a brew temperature, a brew time, and agitation types and times. For example, Block S142 can extract these brew parameters directly from the recipe, and subsequent Blocks of first method S100 can implement these brew parameters during the brew cycle to brew the coffee bean. Block S142 can also deliver prompts to the user to prepare the coffee brewing machine 100 for the brew cycle and/or receive inputs from the user to adjust the brew parameters.

In one example implementation, Block S142 extracts a filter type from the recipe, as described above, and renders—on the display 112—an instruction to insert a filter of the filter type into the coffee brewing machine 100 accordingly prior to the initiating the brew cycle.

In another example implementation, Block S142 prompts a user to enter a selection for a final brew volume, such as for a four-ounces, six-ounce, or twelve-ounce pour. Block S142 can thus set a volume of heating water to be portioned from the boiler 130 into the brew chamber 140 in Block S154 accordingly. In this example implementation, Block S142 can also calculate a mass, weight, or volume of grounds to be added to the brew chamber 140 based on the final brew volume selection, a water absorption capacity of the grounds, and/or a ratio of water to grounds specified in the recipe, etc., and Block S142 can then interface with Block S130 to prompt the user to dispense the calculated amount of coffee grounds into the brew chamber 140. For example, Block S142 can initiate the brew cycle by triggering Block S152 to heat water in the boiler 130 to a target brew temperature for the coffee bean and render on the display 112 a prompt to select a final brew volume from a set of final volumes (e.g., 4 oz, 6 oz, or 12 oz). Block S142 can then calculate the corresponding amount of coffee grounds and the volume of water for dispensation into the brew chamber 140 in Block S154, and Block S130 can render a text-based instruction on the display 112 to dispense the amount of coffee beans into the brew chamber 140 and to enter an input (e.g., by hitting a "Start" button) when completed. Once a user enters the appropriate input, and Block S154 can begin to dispense the calculated volume of water into the brew chamber 140. Alternatively, Block S142 can initiate the brew cycle by triggering Block S152 to preheat water in the boiler 130 to the brew temperate, render a prompt on the display 112 to manually dispense a preset amount of coffee grounds into the brew chamber 140, and then trigger Bock S154 to portion a preset volume of water into the brew chamber 140 in response to a user input into the coffee brewing machine 100 indicating the grounds were loaded into the brew chamber 140. However, Block S142 can function in any other way to initiate a brew cycle.

In this variation, first method S100 also includes Block S152, which recites heating water in a boiler 130 to a target temperature specified by the recipe. Generally, Block S152 controls a heating element coupled to a boiler 130 within the coffee brewing machine 100 to preheat water to the brewing temperature (or to another temperature specified in the recipe) prior to dispensation of a particular volume of water into the brew chamber 140. For example, Block S152 can interface with the temperature sensor 131 (e.g., a thermistor) and implement closed-loop feedback to control the heating element to heat and maintain water in the boiler 130 at the target temperature. However, Block S152 can function in any other way to control a temperature of water in the boiler 130 within the coffee brewing machine 100.

This variation of first method S100 also includes Block S154, which recites metering a volume of water from the boiler 130 into the brew chamber 140. Generally, Block S154 functions to displace a set volume of heated water—such as specified in the recipe or calculated in Block S142—into the brew chamber 140 by controlling one or more pumps and/or valves within the coffee brewing machine 100. In one implementation, Block S154 triggers a valve 132 between the boiler 130 and ambient air to close and powers an electromechanical pump for a particular period of time to pump air into the boiler 130, thereby displacing heated water from the boiler 130 in to the brew chamber 140. In this implementation, Block S154 can calculate the particular period of time from the target volume of water for dispensation into the brew chamber 140 such that the volume of heated water dispensed into the brew chamber 140 can be controlled and achieved without a flow sensor arranged between the boiler 130 and the brew chamber 140. In a similar implementation, the boiler 130 can be arranged at a height over the brew chamber 140, and Block S154 can trigger a valve 132 between the boiler 130 and the brew chamber 140 to open for a particular period of time (similarly calculated) to dispense a particular volume of heated water from the boiler 130 into the brew chamber 140 (also without interfacing with a flow sensor arranged therebetween). Alternatively, Block S154 can interface with a flow sensor and the pump 150 within the coffee brewing machine 100 to monitor a volume of heated water dispensed into the brew chamber 140 and to control the pump accordingly. However, Block S154 can control any other actuator within the coffee brewing machine 100 to portion a particular volume of water from the boiler 130 into the brew chamber 140 in any other suitable way.

In this variation, first method S100 further includes Block S160, which recites heating the brew chamber 140 to maintain the volume of water near the target temperature. Generally, Block S154 dispenses the volume of heated water into the brew chamber 140, Block S160 functions to control a heating element coupled to the brew chamber 140—based on an output of a temperature sensor 141 also coupled to the brew chamber 140—to maintain the temperature of the water and coffee grounds (i.e., the brew mixture) at the brew temperature. For example, Block S160 can implement closed-loop (e.g., proportional-integral-derivative, or PID) feedback to hold the temperature of the brew mixture at the target brew temperature.

Block S160 can also function to preheat the brew chamber 140 to the target temperature before Block 154 dispenses (any) heated water into the brew chamber 140. In particular, Block S160 can implement closed loop feedback to power the heating element according to the target temperature and to an output of the temperature sensor 141 coupled to the brew chamber 140, thereby heating the brew chamber 140 up to a temperature substantially identical to the temperature of heated water in the boiler 130. Thus, when Block S154 meters heated water from the boiler into the brew chamber 140, the temperature of the water and the temperature of the brew chamber can be substantially similar such that the temperature of the water—now exposed to the coffee grounds—does not shift substantially from the target brew temperature. Block S160 can preheat the brew chamber to substantially ensure that the grounds dispensed into the brew chamber are exposed to the heated water dispensed into the brew chamber 140 in Block S154 only at the (or within a threshold range of) the target brew temperature. Block S154 can thus delay dispensation of heated water from the boiler 130 into the brew chamber 140 until the temperature sensor 141 indicates that the brew chamber 140 can reached the target brew temperature and/or has leveled off at a temperature within a threshold range of the target brew temperature, such as within 0.5° C. of the target brew temperature for ten seconds.

Block S160 can further control the heating element to adjust the temperature of the brew mixture during the brew cycle according to a time-dependent temperature profile. For example, Block S152 can preheat water in the boiler 130 to an initial brew temperature, and Block S160 can control the heating element in the brew chamber 140 to hold the brew mixture at the initial temperature for a first period of time, then ramp the temperature of the brew mixture up to a second temperature at a particular rate (i.e., change in temperature per unit time), and finally hold the brew mixture at the second temperature before dispensation of the fluid from the brew chamber 140. However, Block S160 can control the heating element coupled to the brew chamber 140 to implement any other time-dependent brew temperature profile specified in the recipe set in Block S142 (or Block S140).

Block S160 can also record temperature data of the brew mixture and/or the brew chamber 140 during the brew cycle. For example, Block S160 can survey the temperature sensor 141 within the brew chamber 140 at a preset rate (e.g., 10 Hz) during the brew cycle and store measured temperatures locally in memory within the coffee brewing machine 100, such as with a tag or coffee source identifier identifying the brew cycle number and/or the coffee bean. Block S160 can additionally or alternatively upload the set of temperatures—with the coffee source identifier—to a remote database of brew data, such as in real-time or asynchronously (e.g., upon completion of the brew cycle). Block S152 can similarly track temperatures of water within the boiler 130 and store the data locally on the coffee brewing machine 100 and/or upload these data to the remote database, and these boiler 130 and brew chamber 140 temperature data can be analyzed locally or remotely to diagnose, troubleshoot, or preempt problems with operation of the coffee brewing machine 100.

However, Block S160 can function in any other way to manage the temperature of the brew mixture within the brew chamber 140 during the brew cycle.

This variation of first method S100 also includes Block S170, which recites displaying an agitation instruction at a first time during the brew cycle according to the recipe, and Block S172, which recites triggering a first alarm to cease agitation at a second time during the brew cycle according to the recipe. Generally, in this variation, Block S170 functions to prompt a user to agitate the brew mixture and Block S172 functions to prompt the user to cease agitation based on an agitation schedule specified in the recipe. For example, Block S154 can trigger a brew cycle timer (e.g., a countdown or a count-up timer) once Block S154 begins to dispense water into the brew chamber 140 or once Block S154 finishes dispensing the complete volume of water in to the brew chamber 140, and first method S100 can maintain and render the timer on the display 112. In this example, Block S170 can prompt a user to manually stir contents of the brewing chamber at a particular time during the brew cycle as specified by the recipe, and Block S172 can control an audio driver 114 (e.g., a speaker) within the coffee brewing machine 100 to sound an audible alarm to alert the user to cease stirring once a stirring period specified in the recipe elapses. Block S170 can also render a textual and/or image-based (e.g., a two-color dot-matrix cartoon) instruction for a type of agitation, such as stirring in a circular motion, stirring in a lateral motion, stirring in a zigzag motion, or punching down the grounds from the surface of the brew mixture, such as defined in the recipe for the agitation period. Block S170 can additionally or alternatively deliver an audible alarm to prompt the user to begin stirring, such as through an audio driver 114 or speaker 114 within the coffee brewing machine 100, and Block S172 can additionally or alternatively deliver a visual cue on the display 112 to cease agitation. Block S172 (and other Blocks of the first method S100) can also render flashes on the display or otherwise modulate an intensity of a backlight of the display to provide a visual cue for a requested manual action at the coffee brewing machine 100. However, Block S170 and Block S172 can cooperate in any other way to guide a user in manually agitating contents of the brew chamber 140—such as in a particular agitation pattern—and ceasing agitation based on an agitation schedule specified in the recipe.

In this variation, first method S100 can further include Block S174, which recites displaying a second agitation instruction at a fourth time during the brew cycle according to the recipe, the fourth time between the second time and the third time. Generally, Block S174 implements functionality similar to Blocks S170 and 172 to prompt the user to execute a second agitation schedule. For example, Blocks S170 and S172 can cooperate to prompt the user to stir the contents of the brew chamber 140 in a circular motion over a period of ten seconds shortly after Block S154 dispenses the volume of heated water in to the brew chamber 140 (e.g., from 0:10 to 0:20 on the brew cycle timer), and Block S174 can prompt the user to punch down the brew mixture for ten seconds following a fifty-second rest period (e.g., from 1:10 to 1:20 on the brew cycle timer). Block S174 can thus deliver audible and/or visual prompts to begin and then cease a second agitation cycle over a particular period of time during the brew cycle and as defined in the recipe. However, first method S100 can deliver audible and/or visual instructions to prompt the user to complete any other number and/or type of agitation cycles during the brew cycle.

In this variation, first method S100 further includes Block S180, which recites triggering a second alarm to dispense fluid from the brew chamber 140 at a third time during the brew cycle according to the recipe. Generally, Block S180 functions to prompt the user to manually begin dispensation of fluid (i.e., brewed coffee) from the brew chamber 140 upon completion of a water-to-ground contact time specified in the recipe. For example, Block S180 can render an textual and/or cartoon-based instruction on the display 112 and/or sound an audible alarm to prompt the user to open a manual valve 142 at a base of the coffee brewing machine 100, thereby releasing fluid from the brew chamber 140 and into a vessel below, such as directly into a coffee mug, into a coffee pot, or into a thermos. In this example, manual actuation of the valve 142 can enable fluid to passively exit the brew chamber 140 (i.e., via gravity). However, for the coffee brewing machine 100 that also includes a manually-operated plunger 170, such as shown in FIG. 3, Block S180 can also prompt to open the valve 142 and to then actuate the plunger 170 into the brew chamber 140, thereby relatively rapidly evacuating fluid from the brew chamber 140 and terminating contact between the fluid and the coffee grounds, such as specified in the recipe for the coffee bean. For example, Block S180 can render on the display 112 a textual command to actuate the plunger 170. Block S180 can also interface with a linear or arcuate sensor coupled to the plunger 170 or to a pivoting plunger lever 172, respectively, to track the position of the plunger 170 and to guide displacement of the plunger 170 during actuation by the user, such as by displaying visual indicators of a target position and an actual position of the plunger 170 and prompting the user to align the visual indicators of the target position and the actual position of the plunger 170 through manual displacement of the plunger 170. Similarly, once substantially all fluid has passively drained from the brew chamber 140, Block S180 can prompt the user to actuate the plunger 170 into the brew chamber 140 to evacuate any remaining fluid therefrom. However, Block S180 can function in any other way to prompt the user to manually release fluid from the brew chamber 140.

In this variation, Blocks of first method S100, such as Blocks S170, S172, and S180, can also interface with a local coffee grinder to adjust brew parameters for the brew cycle. For example, Block S130 can download a grind setting and grind hours (or wear) of a local coffee grinder and estimate a profile and size distribution of grounds loaded into the brew chamber 140 for the current brew cycle, and Blocks S170 and S172 can implement methods similar to Block S140 described above to adjust the first time for displaying the agitation instruction and the second time for triggering the first alarm to cease agitation, respectively, during the brew cycle according to the profile and size distribution of the coffee grounds. Block S180 can similarly adjust the third time for triggering the second alarm based on the profile and size distribution of the coffee grounds loaded into the coffee brewing machine 100 for the brew cycle.

Furthermore, Blocks S142, S170 S172, S174, and/or S180, etc. can additionally or alternatively deliver audible and/or visual prompts for inputting brew parameters (e.g., a final brew volume) and for guiding manual realization of brew parameters (e.g., filter type, agitation, dispensing of fluid from the brew chamber 140) through an external electronic device in communication with the coffee brewing machine 100. For example, the coffee brewing machine 100 can communication with a nearby mobile computing device (e.g., a smartphone, a tablet) over Wi-Fi or Bluetooth communication protocol, and Blocks S142, S170 S172, S174, and S180 can deliver audible and visual prompts to a user through a speaker 114 and the display 112 (e.g., a touchscreen), respectively, integrated into the mobile computing device. In this example, Blocks S142, S170 S172, S174, and/or S180 can also receive inputs from the user via the mobile computing device, such as through a touchscreen integrated into the mobile computing device. However, Blocks of first method S100 can interface with any other actuator (e.g., display, speaker) within or outside the coffee brewing machine 100 to communicate data to the user and to receive inputs from the user.

In this variation, first method S100 can further prepare the coffee brewing machine 100 for a subsequent brew cycle with the same coffee bean (e.g., with coffee beans from the same roast batch and/or from the same roaster) or with a different coffee bean (e.g., with coffee beans from a different roast batch and/or from a different roaster).

In this implementation, first method S100 can include Block S190, which recites refilling the boiler 130. For example, Block S190 can control a valve 132 and/or the pump 150—similar to Block S154 described above—to transfer water from the reservoir 120 (i.e., a holding tank) into the boiler 130 to return the water level in the boiler 130 to a particular level following dispensation of heated water from the boiler 130 in Block S154.

Blocks of first method S100 can then repeat to brew a second volume (e.g., a cup, a pot) of coffee. In one example in which first method S100 brews a second cup of coffee from a different coffee bean, Block S110 can receive a second coffee source identifier, Block S120 can retrieve a second recipe for a second coffee bean based on the second coffee source identifier, and Block S142 can initiate a second brew cycle through techniques similar to those described above. Block S152 can then heat water in the boiler 130 to a second target temperature according to the second recipe, Block S154 can meter a second volume of water from the boiler 130 into the brew chamber 140, and Block S160 can heat the brew chamber 140 to maintain the second volume of water near the second target temperature. Finally, Block S170 can display a second agitation instruction at a first time during the second brew cycle according to the second recipe, Block S172 can trigger a first alarm to cease agitation at a second time during the second brew cycle according to the second recipe, and Block S180 can trigger a second alarm to dispense fluid from the brew chamber 140 at a third time during the second brew cycle according to the second recipe. Blocks of first method S100 can thus repeat to brew sequential volumes of coffee from the same or different coffee beans based on preset recipes corresponding to coffee beans selected for each brew cycle.

However, in this variation, Blocks of first method S100 can function in any other way to semi-automatically implement parameters specified in a recipe for a particular coffee bean selected for brewing on a coffee brewing machine.

8. Second Method and Applications

As shown in FIG. 4, a method for transmitting brewing recipes to coffee brewing machines includes: collecting a coffee source identifier corresponding to a coffee roast batch in Block S210; loading a set of brew parameters assigned to the coffee roast batch in Block S220, the set of brew parameters including a brew temperature and a steep time; identifying a particular coffee brewing machine in a set of coffee brewing machines in Block S230, the particular coffee brewing machine designated to brew coffee from the coffee roast batch; and transmitting the set of brew parameters with the coffee source identifier to the coffee brewing machine 100 over a computer network in Block S240, the set of brew parameters defining a recipe for brewing coffee from the coffee roast batch at the coffee brewing machine 100.

Generally, second method S200 functions to push a recipe for brewing a volume of coffee with a particular coffee bean from an entity associated with roasting the particular coffee bean to a particular coffee brewing machine designated to brew coffee with the particular coffee bean. The particular coffee brewing machine can then execute the first method described above to implement the recipe thus received. For example, once a coffee roaster roasts a batch of coffee beans, the coffee roaster can define, refine, or tweak a brew recipe specific to the roast batch, such as a brew temperature, a steep time (i.e., brew duration), an agitation schedule, a grind profile or grind size, and/or a coffee ground-to-water ratio, etc. In this example, the roaster can brew test cups of coffee on a "master" coffee brewing machine, which can record brewing parameters selected or implemented by the roaster during the test tests, and the roaster can select a preferred or favorite test cup. The master coffee brewing machine can then execute Block S220 of second method S200 to generate a recipe for the particular coffee bean based on the set of parameters recorded for the selected test cup, execute Block S230 to identify coffee brewing machines affiliated with the roaster (e.g., coffee brewing machines in coffee shops that serve coffee beans from the roaster), and execute Block S240 of second method S200 to push (i.e., automatically transmit) the recipe to the identified coffee brewing machine(s) with an identifier of the corresponding coffee bean. Thus, a coffee brewing machine that received the recipe can execute the first method described above to implement the recipe when the corresponding coffee bean is scanned or selected for a subsequent brew cycle at the coffee brewing machine 100.

Blocks of second method S200 can thus be implemented on coffee brewing machine, such as the coffee brewing machine 100 described above and shown in FIG. 3 or a master coffee brewing machine as described above. Blocks of second method S200 can additionally or alternatively be implemented on a remote computer system, such as a computer network or a remote server.

Block S210 of second method S200 recites collecting a coffee source identifier corresponding to a coffee roast batch. Generally, Block S210 of second method S200 functions to receive an identifier for the present coffee bean and to pair this identifier with the recipe specific to the coffee bean and generated in Block S220. Block S210 can therefore implement methods or techniques similar to those of Block S110 described above to collect the coffee source identifier. For example, Block S210 can receive an optical scan of a bar code, a QR code, a serial number, or any other symbol printed or arranged on a package containing or designated to contain the coffee bean, and Block S210 can pair this identifier with the recipe generated in Block S220. In another example, Block S210 can receive a batch number, a serial number (e.g., a unique ID) or an other alphanumeric sequence scanned from an RFID tag arranged on or designated for a package containing the coffee bean, and Block S210 can pair this alphanumeric sequence with the recipe generated in Block S220. However, Block S210 can collect an identifier of the coffee bean in any other form and in any other way and pair this identifier with a particular batch, roast, or group of coffee beans.

Block S220 of second method S200 recites loading a set of brew parameters assigned to the coffee roast batch, the set of brew parameters including a brew temperature and a steep time. Generally, Block S220 functions to collect brew parameters selected by the roaster for the coffee bean (e.g., the roast or roast batch of coffee beans) and to aggregate these brew parameters into a recipe for the coffee bean.

In one implementation, Block S220 records brew parameters previously applied at a "master" coffee brewing machine during a test brew cycle for the coffee bean. For example, Block S220 can collect a brew temperature and a steep time applied at the master coffee brewing machine during a previous test brew cycle, the previous test brew cycle selected by the roaster as the preferred or favorite test cup for the coffee bean.

Block S220 can also collect data corresponding to manual inputs supplied by the roaster during the selected test brew cycle and incorporated these manual inputs into the recipe. For example, Block S220 can record a first time during the selected test brew cycle at which the roaster begins agitation of fluid within a brew chamber 140 of the master coffee brewing machine, a second time at which the roaster ceases agitation of the fluid, and a steep time corresponding to an elapsed time between initiation of the text brew cycle and dispensation of fluid from the brew chamber 140 of the master coffee brewing machine. Block S220 can thus automatically define agitation start and stop times and steep time in the recipe for the coffee based on these manual inputs recorded at the master coffee brewing machine during the test brew cycle corresponding to the selected test cup of coffee brewed with the coffee bean.

Block S220 can additionally or alternatively prompt the roaster to manually enter specific agitation instructions for detected agitations periods during the selected test brew cycle, and Block S220 can incorporate these data into the recipe accordingly.

Alternatively, Block S210 can prompt manual selection or entry of the coffee source identifier, Block S220 can prompt manual selection or entry of brew parameters for the coffee bean, and Blocks S210 and S220 can cooperate to generate the recipe associated with the coffee source identifier and defining the selected or entered brew parameters. In one example, Block S210 can prompt the roaster to enter a batch number of the coffee bean or to select a sequence of coffee source identifiers of coffee bags allocated for the coffee bean. In another example, Block S220 can prompt the roaster to manually enter agitation data for the coffee bean, such as agitation type, agitation start time, and/or agitation duration for one or more agitation periods for a brew cycle with the coffee bean. In this example, Block S220 can also prompt the roaster to enter a total time for the brew cycle, a volume of water to dispense into the brew chamber 140, and/or any other parameter for a brew cycle specific to the coffee bean, and Block S220 can generate the recipe for the coffee bean (e.g., for the roast batch, for the roaster, etc.) accordingly.

Block S230 of second method S200 recites identifying a particular coffee brewing machine in a set of coffee brewing machines, the particular coffee brewing machine designated to brew coffee from the coffee roast batch. Generally, Block 230 functions to automatically populate a list of coffee brewing machines to which to push the recipe for the coffee bean, the selected coffee brewing machines likely or possibly to brew the coffee bean in the future. In particular, Block S230 identifies coffee brewing machines operated by the roaster and/or operated by entities affiliated with roaster (e.g., by contract) and therefore designated as coffee brewing machines that may brew coffee beans roasted and supplied by the roaster.

In one implementation, Block S230 accesses a list of coffee brewing machines associated with one or more cafés or shops designated to receive the roast batch. For example, the roaster can roast a single batch of coffee designated for a single coffee shop, and Block S230 can access an order form for the roast batch (such as stored locally on the master coffee brewing machine), identify the designated coffee shop for the order from the order form, and retrieve a list of coffee brewing machine operated by the designated coffee shop, such as from a remote server or database containing location and/or shop affiliation data for each coffee brewing machine configured to execute the first method. In another example, Block S230 can retrieve a list of all coffee brewing machines operated by coffee shops affiliated with the coffee roasters, such as stored locally on the master coffee brewing machine or remotely on a database owned by the roaster.

Block S230 can collect a list of one or more unique addresses, each address affiliated with a unique coffee brewing machine. For example, Block S230 can collect an Internet Protocol (IP) address or an email address assigned to each identified coffee brewing machine. However, Block S230 can identify affiliated coffee brewing machines and populate a list of any other suitable type of addresses for the identified coffee brewing machines in any other suitable way.

Block S240 of second method S200 recites transmitting the set of brew parameters with the coffee source identifier to the coffee brewing machine 100 over a computer network, the set of brew parameters defining a recipe for brewing coffee from the coffee roast batch at the coffee brewing machine 100. Generally, Block S240 functions to push automatically the recipe generated in Block S220—tagged with the coffee source identifier collected in Block S210—to one or more coffee brewing machines identified in Block S230 such that these coffee brewing machines are already loaded with the recipe specific to the coffee bean when brewing cycles with the coffee bean are later initiated at the coffee brewing machine 100s. For example, Block S240 can upload the recipe, the coffee source identifier, and the list of addresses for the identified coffee brewing machines to a computer network, such as over Wi-Fi, cellular, or Ethernet communication, and the computer network can distribute the recipe and the coffee source identifier to the specified coffee brewing machine 100s.

In one implementation, Block S240 transmits the recipe and the coffee source identifier for a new coffee bean—such as a new type of coffee bean or a new roast batch of the same type of coffee bean now available from the roaster and/or designated for a particular café, coffee shop, or coffee brewing machine, etc.—to the identified coffee brewing machines. In this implementation, the recipe thus defines a new recipe specifying a set of brew parameters for a new type, batch, or source, etc. of coffee bean.

In another implementation, Block S240 transmits the recipe and the coffee source identifier for an existing coffee bean corresponding to an earlier recipe previously loaded onto one or more coffee brewing machines, such as for an existing type of coffee bean supplied by the roaster or a previous roast type or roach batch provided by the roaster. Thus, in this implementation, Block S240 can distribute the recipe to one or more coffee brewing machines to override a previous recipe (i.e., a previous set of brew parameters) associated with the coffee source identifier and stored in memory on the coffee brewing machine 100s.

However, Blocks S210, S220, S230, and S240 of second method S200 can cooperate in any other way to generate a new recipe for a new coffee source identifier and/or to update an existing recipe for a current coffee source identifier and to distribute (i.e., push) the new and/or updated recipe to associated coffee brewing machines.

The methods and coffee brewing machine of the invention can be embodied and/or implemented at least in part as a machine configured to receive a computer-readable medium storing computer-readable instructions. The instructions can be executed by computer-executable components integrated with an application, applet, host, server, network, website, communication service, communication interface, hardware/firmware/software elements of a user computer or mobile device, or any suitable combination thereof. Other systems and methods of the embodiments can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for brewing a cup of coffee at a coffee brewing machine, comprising:
   receiving a coffee source identifier;
   retrieving a recipe for a brewing coffee bean based on the coffee source identifier comprising: scanning a code applied to a coffee bag containing the coffee bean, and wherein retrieving the recipe for brewing the coffee bean comprises downloading the recipe from a remote database of recipes based on the code;
   initiating a brew cycle;
   heating water in a boiler to a target temperature specified by the recipe;
   metering a volume of water from the boiler into a brew chamber;
   heating the brew chamber to maintain the volume of water near the target temperature;
   according to the recipe, displaying an agitation instruction at a first time during the brew cycle;
   according to the recipe, triggering a first alarm to cease agitation at a second time during the brew cycle; and
   according to the recipe, triggering a second alarm to dispense fluid from the brew chamber at a third time during the brew cycle.

2. The method of claim 1, further comprising
   refilling the boiler,
   receiving a second coffee source identifier,
   retrieving a second recipe for a second coffee bean based on the second coffee source identifier,
   initiating a second brew cycle,
   heating water in the boiler to a second target temperature according to the second recipe,
   metering a second volume of water from the boiler into the brew chamber,
   heating the brew chamber to maintain the second volume of water near the second target temperature,
   displaying a second agitation instruction at a first time during the second brew cycle according to the second recipe,
   triggering a first alarm to cease agitation at a second time during the second brew cycle according to the second recipe, and
   triggering a second alarm to dispense fluid from the brew chamber at a third time during the second brew cycle according to the second recipe.

3. The method of claim 1, further comprising displaying a second agitation instruction at a fourth time during the brew cycle according to the recipe, the fourth time between the second time and the third time.

4. The method of claim 3, wherein displaying the agitation instruction comprises displaying an instruction to stir contents of the brewing chamber in a circular motion, and wherein displaying the second agitation instruction comprises displaying an instruction to punch down contents of the brewing chamber.

5. The method of claim 1, wherein receiving the coffee source identifier comprises receiving a manual selection for the coffee bean from a list of coffee beans, and wherein retrieving the recipe for brewing the coffee bean comprises selecting the recipe previously pushed to the coffee brewing machine from a coffee roaster supplying the coffee bean and stored locally in memory on the coffee brewing machine.

6. The method of claim 1, wherein scanning the code on the coffee bag comprises reading a quick-response code applied onto the coffee bag with an optical sensor coupled to the coffee brewing machine and identifying a coffee roaster supplying the coffee bean and a roast date of the coffee bean from the quick-response code, and wherein retrieving the recipe for brewing the coffee bean comprises downloading the recipe assigned to the coffee bean for the roast date by the coffee roaster.

7. The method of claim 1, further comprising receiving a selection for a final brew volume, wherein metering the volume of water from the boiler into the brew chamber comprises portioning the volume of water into the brew chamber based on the selection for final brew volume.

8. The method of claim 7, further comprising transmitting a grind setting and a grind weight to a local coffee grinder, the grind setting specified in the recipe, and the grind weight based on the selection for the final brew volume, and wherein metering the volume of water from the boiler into the brew chamber comprises portioning the volume of water into the brew chamber based on a water absorption capacity of the coffee bean.

9. The method of claim 7, further comprising displaying an instruction for dispensing a weight of coffee grounds of a particular grind size into the brewing chamber.

10. The method of claim 1, wherein heating the brew chamber to maintain the volume of water substantially near the target temperature comprises recording a set of temperatures of fluid in the brew chamber during the brew cycle, and further comprising uploading the set of temperatures tagged with the coffee source identifier to a remote database of brew data.

11. The method of claim 1, wherein displaying the agitation instruction comprises rendering on a digital display in the coffee brewing machine a time of the brew cycle and a prompt to manually stir contents of the brewing chamber, and wherein triggering the first alarm comprises sounding an audible alarm through an audio driver within the coffee brewing machine.

12. The method of claim 1, further comprising downloading a grind setting and grind hours of a local coffee grinder and adjusting the first time for displaying the agitation instruction, adjusting the second time for triggering the first alarm, and adjusting the third time for triggering the second alarm based on the grind setting and grind hours of the local coffee grinder.

13. The method of claim 1, wherein initiating the brew cycle comprises displaying an instruction for a filter type for the brew cycle, the filter type specified in the recipe.

14. The method of claim 1, wherein displaying the agitation instruction comprises rendering the agitation instruction on a mobile computing device wireless connected to the coffee brewing machine, wherein triggering the first alarm comprises outputting a first audible alarm through an audio driver within the mobile computing device, and wherein triggering the second alarm comprises outputting a second audible alarm through the audio driver within the mobile computing device.

15. A method for brewing a cup of coffee at a coffee brewing machine, comprising:
   receiving a coffee source identifier;
   retrieving a recipe for a brewing coffee bean based on the coffee source identifier comprising scanning a code applied to a coffee bag containing the coffee bean, and wherein retrieving the recipe for brewing the coffee bean comprises downloading the recipe from a remote database of recipes based on the code;
   initiating a brew cycle for the brewing coffee bean in a ground form;
   heating water in a boiler to a target temperature specified by the recipe;
   preheating a brew chamber to the target temperature;
   in response to the brew chamber reaching a temperature within a threshold range of the target temperature, metering a volume of water from the boiler into the brew chamber; and
   heating the brew chamber to maintain the volume of water near the target temperature
   according to the recipe, displaying an agitation instruction at a first time during the brew cycle,
   according to the recipe, triggering a first alarm to cease agitation at a second time during the brew cycle, and
   according to the recipe, triggering a second alarm to dispense fluid from the brew chamber at a third time during the brew cycle.

* * * * *